United States Patent
Valette et al.

(10) Patent No.: US 7,595,925 B2
(45) Date of Patent: Sep. 29, 2009

(54) ACTUATING DEVICE HAVING A FLEXIBLE DIAPHRAGM CONTROLLED BY ELECTROWETTING

(75) Inventors: Serge Valette, Grenoble (FR); Yves Fouillet, Voreppe (FR); Olivier Raccurt, Lyons (FR); Jean Berthier, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/997,060

(22) PCT Filed: Aug. 7, 2006

(86) PCT No.: PCT/EP2006/065118

§ 371 (c)(1),
(2), (4) Date: Jan. 28, 2008

(87) PCT Pub. No.: WO2007/017495

PCT Pub. Date: Feb. 15, 2007

(65) Prior Publication Data

US 2008/0212161 A1    Sep. 4, 2008

(30) Foreign Application Priority Data

Aug. 8, 2005    (FR) .................................. 05 52463

(51) Int. Cl.
*G02B 26/00* (2006.01)
(52) U.S. Cl. ...................... 359/290; 359/291
(58) Field of Classification Search ............... 359/290, 359/291
See application file for complete search history.

(56) References Cited

U.S. PATENT DOCUMENTS 6,264,302 B1 * 7/2001 Imanaka et al. ............... 347/19
6,404,941 B1   6/2002 Picard et al.
6,655,787 B1 * 12/2003 Hawkins ....................... 347/54

(Continued)

FOREIGN PATENT DOCUMENTS

EP    1 106 157 A2    6/2001

(Continued)

OTHER PUBLICATIONS

Bruno Berge, "Électrocapillarité et mouillage de films isolants par l'eau", Physique des surfaces et des interfaces/Surface and Interface Physics, C. R. Acad. Sci. Paris, t. 317, Série II, 1993, pp. 157-163 (with abridged English translation).

(Continued)

*Primary Examiner*—Jordan M. Schwartz
*Assistant Examiner*—James C Jones
(74) *Attorney, Agent, or Firm*—Oblon, Spivak, McClelland, Maier & Neustadt, L.L.P.

(57) ABSTRACT

An actuation device with several positions includes a support, at least one flexible membrane attached to the support forming at least one closed containment with the support with volume filled with at least one first liquid in the form of one or several drops, and at least a second liquid, the first liquid and the second liquid being immiscible, and an electrical device to modulate the profile of the membrane by controlling the shape of at least one of the drops.

30 Claims, 14 Drawing Sheets

U.S. PATENT DOCUMENTS

| | | |
|---|---|---|
| 2004/0091201 A1 | 5/2004 | Divoux et al. |
| 2004/0179259 A1 | 9/2004 | Fujii et al. |
| 2005/0100270 A1 | 5/2005 | O'Connor et al. |
| 2007/0273943 A1* | 11/2007 | Hendriks et al. ............... 359/32 |

FOREIGN PATENT DOCUMENTS

| | | |
|---|---|---|
| EP | 1 019 758 B1 | 3/2002 |
| EP | 1 306 704 A1 | 5/2003 |
| WO | WO 2004/099846 A1 | 11/2004 |
| WO | WO 2004/099847 A1 | 11/2004 |

OTHER PUBLICATIONS

Hongjun Zeng, et al., "Piston-Motion Micromirror Based on Electrowetting of Liquids Metals", Journal of Microelectromechanical Systems, vol. 14, No. 2, Apr. 2005, pp. 285-294.

* cited by examiner

US 7,595,925 B2

ACTUATING DEVICE HAVING A FLEXIBLE DIAPHRAGM CONTROLLED BY ELECTROWETTING

TECHNICAL FIELD

The invention relates to an actuation device or micro-device comprising a flexible membrane, the profile of which may be controlled through an electrowetting phenomenon.

In particular, the invention relates to the field of optical devices for which optical properties may be controlled by electrowetting and that in particular uses an optical device with several positions or an adaptative optical device with a flexible membrane, capable of reflecting or transmitting incident light rays.

The invention also relates to a switch device, particularly an optical or electrical switch, which can be open and closed under the control of a flexible membrane with a profile that can be modulated by electrowetting.

The invention also relates to a pump and/or a valve device controlled by a flexible membrane with a profile that can be modulated by electrowetting.

PRIOR ART

An article by B. Berge entitled <<Electrocapillarité et mouillage de films isolants par l'eau >>(Electrocapillarity and wetting of insulating films by water) published in 1993 in C.R. Acad. Sci. Paris, t.137 series II pages 157 to 163, describes a device comprising a conducting liquid drop placed on a dielectric film covering a plane electrode. An electrical voltage applied between the liquid drop and the electrode can vary the wettability of the dielectric material with regard to the liquid. This phenomenon is called "electrowetting".

Document EP 1 019 758 B1 divulges a variable focal lens controlled electrically by means for the electrowetting phenomenon. The lens includes a containment filled with a first liquid, and a second liquid in the form of a drop immiscible with the first liquid, the shape of the drop possibly being modulated by means of the electrowetting phenomenon.

The document <<Piston Motion Micromirror Based on Electrowetting of Liquid Metals >>, Zeng et al., journal of Microelectromechanical Systems, Vol. 14, No. 2, April 2005, presents a device and a method for controlling a micro-mirror by means of the electrowetting phenomenon. The control device includes a support provided with an electrode on which a metallic mercury based drop is supported. The micro-mirror is formed by a rigid stack of thin layers supported on the drop. The micro-mirror may be displaced with respect to the support and positioned at different distances from this support depending on the potential applied to the electrode.

PRESENTATION OF THE INVENTION

The invention uses an actuation device with a flexible membrane, the shape of which can be modulated by electrowetting.

The invention relates firstly to an actuation device comprising:
 a support,
 at least one flexible membrane attached to the support, cooperating with the support to form at least one containment with a given volume filled with at least one first liquid in the form of one or several drops and at least one second fluid with a given volume, the device being capable of adopting several positions including at least one so-called "rest" position in which said one or several drops have given corresponding shapes and the membrane has a given profile, the device also comprising electrical means comprising one or several electrodes, to modulate the profile of the membrane by controlling the shape of at least one of said drops.

According to one possibility, the second fluid may for example be a second liquid, the first liquid and the second fluid preferably being immiscible.

According to another possibility, the second fluid may for example be a gas, for example air or nitrogen, or an inert gas.

According to a first variant embodiment of the actuation device, the containment may be closed such that the profile of the membrane may be modulated with a constant volume of the first liquid and the second fluid in the containment.

According to a second variant embodiment of the actuation device, the containment may be open such that the profile of the membrane may be modulated with a variable volume of the second fluid and a constant volume of the first liquid in the containment. According to this second variant, the actuation device may comprise at least one reservoir communicating with the containment. This reservoir may be partially filled with the second fluid and act as an expansion vessel.

The electrical means may comprise one or several electrodes.

According to one alternative embodiment of the device, one or several electrodes may be integrated into the support and located facing said one or several drops.

According to one possible embodiment of the device, one or several electrodes may be integrated into the membrane.

According to one variant embodiment, the device may include a matrix of electrodes and a matrix of drops facing the matrix of electrodes. In particular, this arrangement enables the membrane to adopt a large number of different profiles.

The electrodes may be covered by at least one dielectric layer.

Said electrical means may also comprise means for controlling the polarisation of electrodes. These means for controlling the polarisation of electrodes may include one or several switch means integrated into the support. These means for controlling the polarisation of electrodes may also include at least one electrode addressing circuit.

According to one possible embodiment of the actuation device, the means for controlling polarisation of electrodes are capable of putting the electrodes into a polarisation state in which at least one first electrode is at a first potential, and at least one other electrode is at a second potential different from the first potential. According to this possible embodiment, the electrodes can be controlled independently of each other by polarisation control means.

According to one alternative embodiment of the device, the membrane may also be provided with one or several electrodes facing the electrodes integrated into the support. This makes it possible to modulate the membrane shape firstly by the electrowetting phenomenon and secondly by attraction between the support electrodes and the membrane electrodes.

According to one possible embodiment, the actuation device may also include at least one cover facing the support that can hold the containment filled with fluids, for example liquids in a closed space.

The protection cover may possibly include at least one anti-reflecting layer or be coupled with at least one anti-reflecting layer.

The actuation device, and particularly the containment filled with fluids, for example liquids, can adopt several shapes, particularly adapting to the profile of the membrane and the shape of the drops.

The device can adopt at least one rest position, for example for which the electrodes are not polarised.

According to one possible embodiment of the device, the membrane may be parallel to a principal plane of the support in the rest position.

The actuation device can adopt at least one position in which the membrane comprises a curved profile. According to one variant, the membrane comprises a curved profile in the rest position.

According to one variant for which, in the rest position, a drop is located facing a zone of the membrane at a distance from the support called the "rest distance" without being in contact with the membrane, the device according to the invention can adopt at least one other position in which said drop is in contact both with the support and the membrane, and holds said membrane zone at a distance from the support different from said rest distance.

According to another variant, in the rest position, at least one drop of the first liquid can be in contact with the support and with the membrane.

According to a different variant, in the rest position, the drops may be in contact with the support and not in contact with the membrane.

The actuation device according to the invention may be capable of adopting at least one position in which at least one drop is in contact both with the support and with the membrane and holds a zone of the membrane at a given distance from the support, and at least one other position in which said drop is in contact both with the support and with the membrane, and holds said membrane zone at another distance from the support different from said given distance.

According to one possible embodiment of the device, the corresponding shapes of the drops may be controlled independently of each other by electrical means. The corresponding stresses that the drops may apply on the membrane may thus be different from each other.

According to another possibility, the actuation device according to the invention can be in a position different from the rest position, in which the membrane profile is different from said given profile, and in which at least one first drop holds a first zone of the membrane at a first distance from the support, and at least one another drop holds a second zone of the membrane at a second distance from the support different from the first distance.

According to one possibility, the actuation device can adopt at least one position different from the rest position, in which the membrane comprises a sinuous profile.

The invention uses an optical device comprising a containment filled with liquid comprising a flexible wall in the form of a membrane that will receive the incident light rays and for which the profile may be controlled by the electrowetting phenomenon.

The invention includes an adaptative optical device comprising an actuation device like that defined above.

According to a first variant, the optical device may be designed to operate in transmission of light rays.

According to this first variant, the membrane may be formed based on a material transparent to light rays. The support and/or electrodes may also be formed based on a material transparent to light rays.

According to this first variant embodiment of the optical device, the refraction index $n_1$ of the first liquid and the refraction index $n_2$ of the second liquid may be equal or approximately equal.

According to one alternative to this first variant, the membrane may include at least one first anti-reflecting layer or it may be coupled with at least one first anti-reflecting layer. The support may also comprise at least one second anti-reflecting layer or it may be coupled with at least one second anti-reflecting layer. This or these anti-reflecting layer(s) may in particular minimise reflection losses when the optical device is used in transmission. According to the first variant, the refraction indexes $n_1$ and $n_2$ of the first liquid and the second liquid may possibly be equal or approximately equal.

According to a second variant, the optical device may be designed to operate in reflection. According to this second variant, the membrane may comprise a light ray reflecting layer or it may be coupled with a light ray reflecting layer.

The invention also relates to an electrical switch device or micro-device comprising:
  an actuation device like that defined above,
  at least one electricity conducting element attached to the actuation device membrane,
  at least one first conducting zone and at least one second conducting zone separate from the first conducting zone, the switch device being capable of being in at least one first position in which the electricity conducting element is in contact with the first conducting zone and the second conducting zone, and at least one second position in which the first conducting zone and/or the second conducting zone is (are) not in contact with the conducting element.

The invention also relates to an optical switch device or micro-device comprising
  an actuation device like that defined above,
  at least one element attached to the membrane of the actuation device, the switch device being capable of being in at least one first position in which said element intercepts an optical beam, and at least one second position in which said element and said beam do not intersect.

The invention also relates to a valve device or micro-device comprising:
  an actuation device like that defined above,
  at least one zone forming at least one channel with the membrane, in which at least one fluid is intended to circulate, the membrane being capable of adopting at least one first position called the "closed" channel in which the membrane or an element attached to the membrane is in contact with said zone, and at least one second position called the "open" channel in which the membrane or said element attached to the membrane is not in contact with said zone.

The invention also relates to a pumping device or micro-device comprising:
  an actuation device like that defined above,
  at least one element forming a piston attached to the membrane,
  at least one chamber called the "work chamber" in which the element forming a piston can move.

BRIEF DESCRIPTION OF THE DRAWINGS

This invention will be better understood after reading the description of example embodiments given purely for guidance and that is in no way limitative, with reference to the appended drawings in which.

Identical, similar or equivalent parts of the different figures are marked with the same numeric references to facilitate comparisons between the different figures.

The different parts shown in the figures are not necessarily shown at the same scale, to make the figures more easily legible.

DETAILED PRESENTATION OF PARTICULAR EMBODIMENTS

Figure 1A:
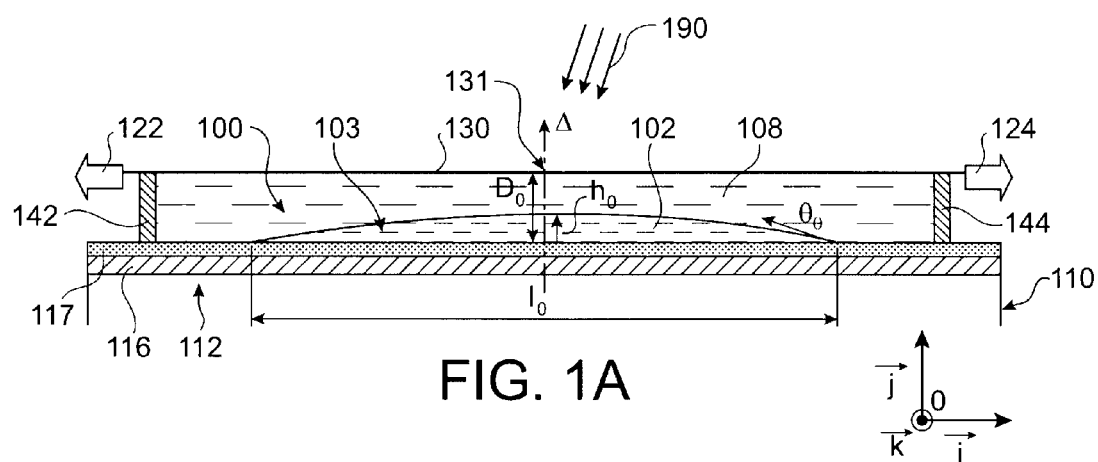
FIGS. 1A-1B show the different positions that can be adopted by a device according to the invention provided with a containment filled with liquid and with a flexible wall.
Figure 1B:
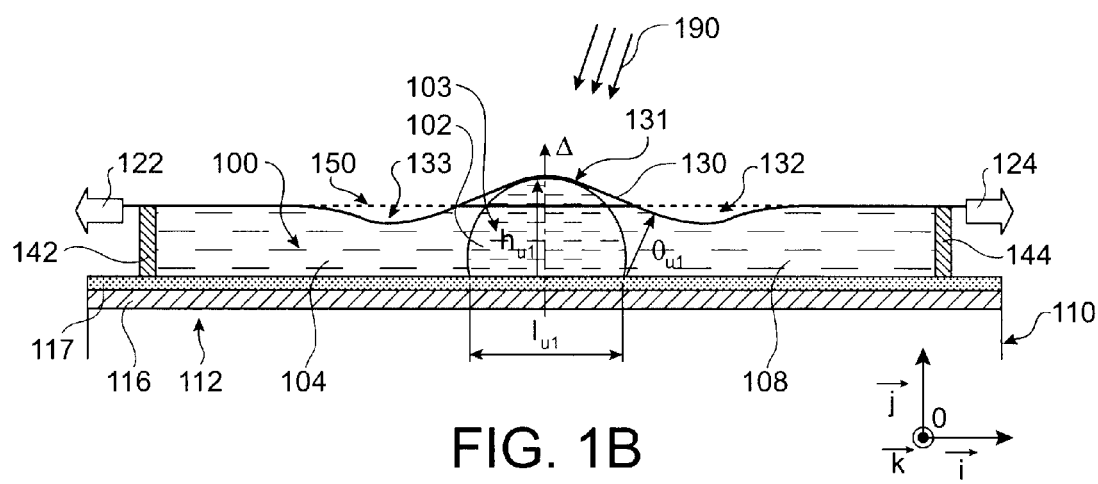

FIGS. 1A and 1B show a sectional view of an example of the actuation device or micro-device with several positions and with a flexible membrane.

This device comprises a containment 100 with volume V filled with a first liquid 102 and a second liquid 108. The first liquid 102 and the second liquid 108 are preferably immiscible. According to one possibility, the first liquid 102 may be a liquid that is non-conducting or slightly conducting of an electrical current, while the second liquid may be a liquid that does conduct electrical current. According to one example, the first liquid 102 and the second liquid 108 may an oil and water respectively.

The containment 100 with volume V is formed between a support 110 on which the liquids 102 and 108 are supported, and a membrane 130 facing the support 110 and attached to it. The actuation device or micro-device comprises elements formed from thin layer(s).

The support 110 may comprise at least one electrode 112 formed from a thin conducting layer 116. The electrode 112 can be polarised by the polarisation control means (not shown) and is covered by a dielectric layer 117, with which the first liquid 102 and the second liquid 108 are in contact. The device may also comprise at least one counter electrode covered by another dielectric layer in contact with the conducting liquid 108 (the counter electrode not being shown in FIGS. 1A and 1B). According to one possibility, the counter electrode may be integrated into or coupled with the membrane 130. According to one possibility (not shown), the counter electrode may be integrated into the support. The means for controlling the polarisation of electrodes may include one or several switch means integrated into the support. These means for controlling the polarisation of electrodes may also include an electrode addressing circuit.

The dielectric layer 117 may be for example between 0.1 μm and 1 μm thick. This dielectric layer 117 may for example be based on silicon oxide or $Si_3N_4$. The first liquid 102 may be in the form of at least one drop 103 in contact with the dielectric layer 117, and placed facing the electrode 112. The wettability of the dielectric layer 117 with regard to the second liquid 108 may be naturally low. According to one possibility, the dielectric 117 may be hydrophobic.

The first liquid 102 and the second liquid 108 occupy a volume $V_1$, for example between 1 nanoliter and several microliters or for example of the order of 10 nl, and a second volume $V_2$, for example between 10 nl and 100 μl or for example of the order of 100 nl, respectively.

The membrane 130 is flexible and can be deformed. The profile of the membrane 130 can be modulated by electrowetting. The membrane 130 may for example be based on $Si_3N_4$ or PDMS (PolyDiMethylSiloxane). The membrane 130 may for example be between 10 nanometers and 10 micrometers thick. The membrane 130 may be attached to pads or walls 142, 144, formed on the support 110. The walls 142, 144, may be orthogonal to a principal plane of the support 110 (the term principal plane of the support 110 will be used throughout this description to refer to a plane belonging to the support parallel to a [O; $\vec{i}$ ; $\vec{k}$] plane of an orthogonal coordinate system [O; $\vec{i}$ ; $\vec{j}$ ; $\vec{k}$]). The walls 142, 144 can keep the membrane 130 tensioned above the support 110 (a tension stress or tension forces on the membrane 130 being represented schematically by arrows 122, 124 in FIGS. 1A and 1B).

The actuation device can be in several positions, depending on the polarisation state of the electrode 112. The shape of the drop 103 can be modified by varying the polarisation state of the electrode 112 or the value of a voltage applied to this electrode 112, so that the profile of the membrane 130 can be deformed or modified by the drop. Electrical means may thus be used to modulate the profile of the membrane 130, by controlling the shape of the drop 103.

Several shape parameters of the drop 103 may be modulated as a function of a voltage U applied to the electrode 112. Some of the drop shape parameters referred to in this description are described below:

the "external surface" of a drop of the first liquid 102 refers to a zone of this drop that is not in contact with the support 110, and in particular with the dielectric layer of the support on which this drop is supported, the term "contact surface" of a drop of the first liquid 102 refers to a zone of this drop in contact with the support 110, and particularly with the dielectric layer of the support on which this drop is supported, the height of the drop at its centre refers to a dimension of the drop measured along a line A parallel to the vector $\vec{j}$ of the orthogonal coordinate system [O; $\vec{i}$ : $\vec{j}$ ; $\vec{k}$], approximately perpendicular to the principal plane of the support 110, the "width" of a drop refers to a dimension denoted lu of the "contact surface" of this drop measured in a plane parallel to the [O; $\vec{i}$ ; $\vec{k}$] plane of the orthogonal coordinate system [O; $\vec{i}$ ; $\vec{j}$ ; $\vec{k}$] or measured in the principal plane of the support 110, the "radius of curvature of the drop" refers to a dimension denoted Ru equal to a value of the radius of an osculating circle on this surface, at a current point on the external surface of this drop, the term "contact angle" θu of the drop refers to an oriented angle between a direction vector of a tangent to the external surface with another vector of the principal plane of the support 110 or the dielectric layer on which this drop is supported, said tangent being output from or passing through an intersection point between the external surface and the contact surface.

FIG. 1A illustrated a position of the device called the "rest" position for which the electrode 112 is not polarised. In this example the rest position, the membrane 130 is not in contact with the drop 103. The membrane 130 may also be parallel to the principal plane of the support 110 and comprise a plane profile when the electrode 112 is not polarised, or when the potential U is zero. In the rest position, the drop 103 of the liquid 102 may for example be in the form of a flattened half-sphere and be in contact with the dielectric layer 117 on a large surface area. When a drop 103 for example of the order of 2 nanoliters is in the rest position, the height of this drop at its centre hu may be equal to h0, where h0 may for example be of the order 40 μm, and a contact angle θu=θ0, where for example θ0 is of the order of 25°. In the rest position, the width of the drop 103 may for example be equal to lu=$l_0$, where $l_0$ may for example be of the order 420 μm, while the parameter Ru of the drop 103 may be such that Ru=R0, where for example R0 may be of the order of 356 μm.

In the rest position, the summit of the drop 103 may be facing a zone denoted 131 of the membrane 130, the zone 131 being located at a distance D=D0, where for example D0 may be between 0.5 μm and 100 μm from the support that will be called the "rest distance".

The rest position of the actuation device according to the invention is not limited to the position described above. According to other possibilities (not shown in FIG. 1A), in the rest position the membrane 130 may comprise a curved profile and/or be in contact with the drop 103.

A change in the position of the device, for example from the rest position to another position, may be made by modifying the potential applied to the electrode 112. A change in voltage or potential on the electrode 112 causes a variation of the wettability of the dielectric layer 117 with respect to the first liquid 102, this variation in particular being capable of causing a deformation of the drop 103 of the liquid 102. An increase in the potential of the electrode 112 may also in particular reduce the wettability of the dielectric layer 117 with regard to the first liquid 102, this reduction possibly reducing the contact surface of the drop 103 with the dielectric layer 117 and it may cause grouping or concentration of the drop 103 of the first liquid 102 on itself. Grouping of the drop 103 may cause this drop to come into contact with the membrane 130 and apply a pressure on this membrane, the pressure causing a deformation of the membrane 130 or a modification to the profile of the membrane 130. According to one example, by increasing the potential of the electrode 112, in particular the height hu at the centre of the drop 103 can be increased, and a pressure on the membrane 130 can be induced through this drop 103, this pressure possibly modifying the profile of the membrane 130. Some zones 131 of the membrane 130 in contact with the drop 103 and stressed by the drop 103 can move away from the support. According to one possibility, depending particularly on the viscosity of the liquids 102 and 108, the flexibility of the membrane 130, some other zones 132, 133 of the membrane 103 can move towards the support 110. According to one possible embodiment, the containment 100 may be closed. In this case, it is possible for the change from one position, for example from the rest position to other positions of the membrane 130, to be made at constant volume V.

FIG. 1B shows a second position of the device. For this position, the electrode 112 is polarised using a voltage or a potential U=U1 higher than for the first position, where U1 may for example be of the order of 100 volts. In the second position, the first liquid 102 and the dielectric layer 117 are in contact over a smaller contact area than in the rest position. The edges of the drop 103 of liquid 102 are also more concentrated than in the first position. In the second position, the drop 103 of the first liquid 102 is in contact with the membrane 130 and applies pressure on this membrane. In the second position, the membrane 130 may have a shape different from the shape at the rest position, for example a sinuous or wavy shape (the rest position of the membrane being shown in FIG. 1B by discontinuous lines reference 150).

In the second position, the height hu at the centre of the drop 103 of the liquid 102 for example of the order of 2 nanoliters may be equal to hu1, where hu1 may for example be of the order of 60 μm, greater than the height h0 in the rest position. The summit of the drop 103 may be in contact with zone 131 of the membrane 130, the zone 131 being located at a distance Du from the support approximately equal to Du1, greater than the "rest distance". The width lu of the drop 103 of liquid 102 in the second position may also be equal to lu1, for example where lu1 is of the order of 285 μm, less than the width $l_0$ in the rest position. The radius of curvature Ru of the drop 103 of liquid 102 may also be Ru1, where Ru1 may for example be of the order of 202 μm (defined along a direction parallel to the axis $\vec{i}$ of the orthogonal coordinate system [O; $\vec{i}$ ; $\vec{j}$ ; $\vec{k}$]) less than the radius of curvature $R_0$ in the first position. The drop 103 of liquid 102 may also make a contact angle θu=θu1, for example of the order of 110°, greater than the contact angle $θ_0$ in the rest position, where $θ_0$ may for example be of the order of 25°.

The variation of the contact angle θu adopted by the drop 103 as a function of the polarisation states U of the electrode may for example vary such that $\cos\theta_u \approx \cos\theta_0 + kU^2$ (1) (where k is a constant such that $k=2*10^{-5}$ and $\theta_0$ is the value of the contact angle θu of the drop in the rest position).

The device according to the invention is not limited to the two positions, and it may be designed to adopt N different positions (where N>2) or a multitude of different profiles of the membrane 130 and the shape of the drop 103.

According to one particular embodiment of the actuation device, this device may be integrated into or it may belong to an optical device or an adaptative optical device provided with an optical system for which the properties may be modulated by electrowetting. The optical system may be a system operating in transmission of light rays 190. In this case, the membrane 130 may comprise or be formed from and/or be covered by a transparent material (not shown), capable of allowing incident light rays to pass through it. The membrane 130 associated with the first liquid 102, the second liquid 108 and the support 110, forms an optical system capable of deviating the optical path of incident light rays 190. In the case in which the optical system operates in transmission, the first liquid 102 and the second liquid 108 may be chosen to have refraction indexes $n_1$ and $n_2$ equal or approximately equal or similar. "Similar" or "approximately equal" means that the difference $(n_1-n_2)$ between the refraction indexes of the first liquid 102 and the second liquid 108 is no more than 0.05. The conducting layer 116 may possibly be based on a transparent material, for example ITO (ITO for Indium Tin Oxide). The dielectric layer 117 may also possibly be based on a transparent material, for example such as $Si_3N_4$ or $SiO_2$. Deformations of the containment 100 filled with fluids and provided with a flexible or supple wall 130, modify the surface of incident optical waves on the optical system. Such a deformation of the membrane 130 modifies the optical properties of the optical system, and particularly the optical surface through which the light rays 190 are designed to penetrate.

The change from one position, for example from the rest position to other positions of the optical system and the membrane 130, may possibly be made at constant volume V.

In the second position (FIG. 1B), the profile of the membrane 130 confers optical properties to the optical system, different from the properties in the rest position (FIG. 1A). The optical path of the light rays 190 passing through the optical system in the second position is different from the path of the light rays passing through the optical system in the first position.

Figure 2:
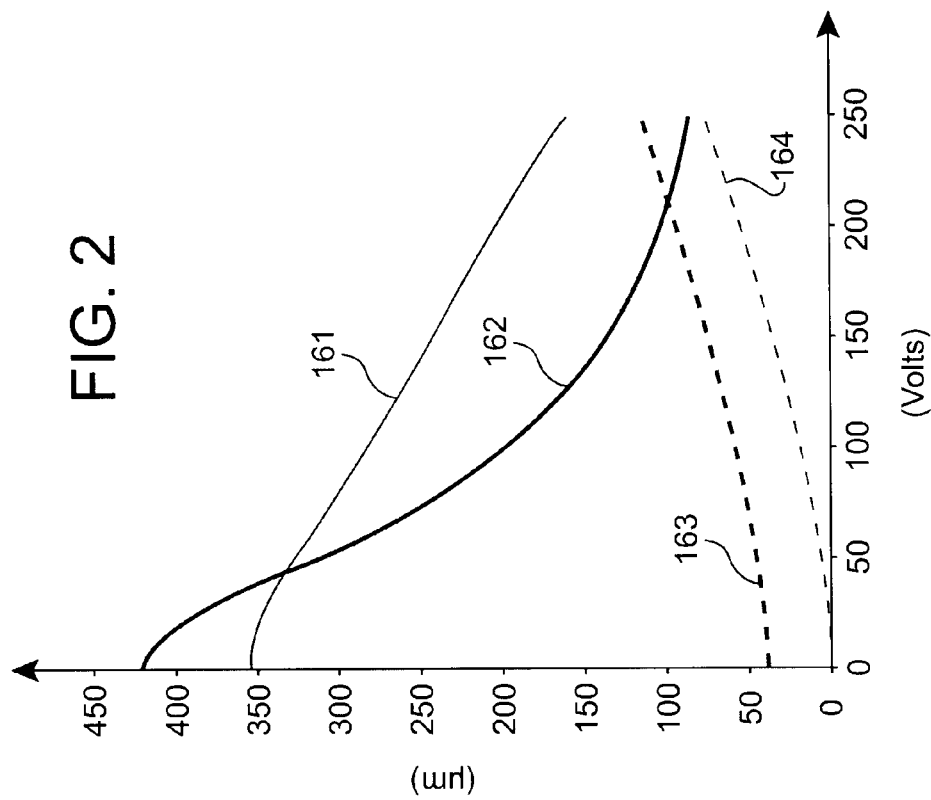

FIG. 2 shows curves 161, 162, 163, 164, representative of changes in the radius of curvature Ru, height hu, length lu and a parameter Δhu=hu−h0, of a drop 103 of liquid 102 (where h0 is the height at the centre of the drop when this drop is in the rest position) depending on a potential U applied to the electrode 112, the drop 103 having a volume V1=2 nanoliters, and a contact angle in the rest position θ0 of the order of 25°.

Figure 3:
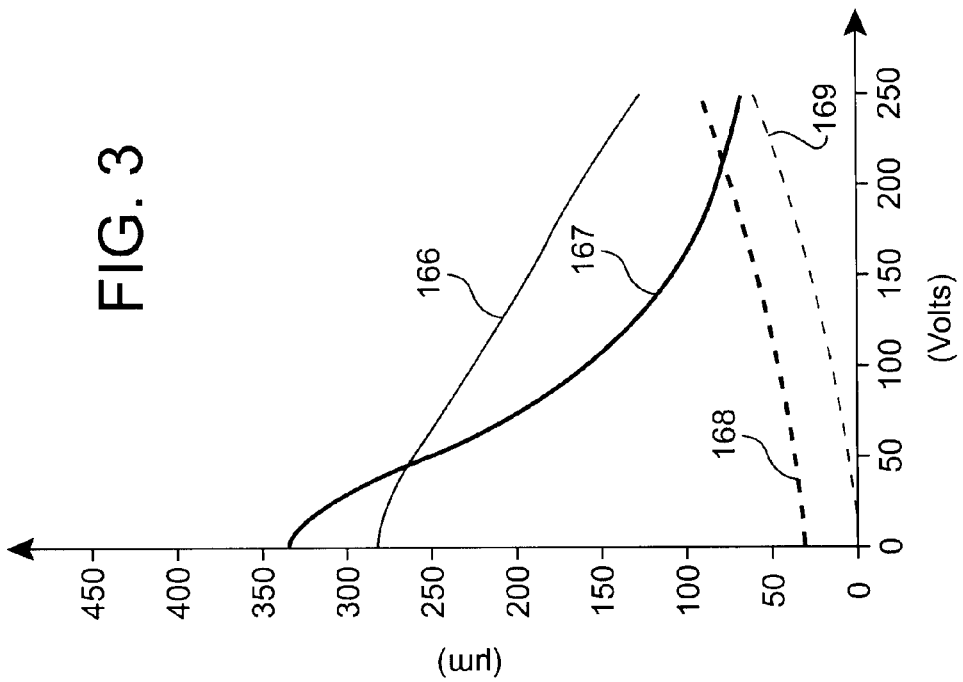
FIGS. 2 and 3 show variations of shape parameters in a device according to the invention, of drops included in a chamber with a flexible wall filled with at least one first liquid and at least one second fluid.

FIG. 3 shows curves 166, 167, 168, 169, representative of changes to the radius of curvature Ru, the height hu, the length lu and a parameter Δhu=hu−h0 of a drop 103 of liquid 102, as a function of a potential U applied to the electrode 112, the drop 103 having a volume V1=1 nanoliter, and a contact angle in the rest position θ0 of the order of 25°.

The actuation device is not limited to a single drop associated with a single electrode and it may comprise a plurality of drops associated with a plurality of electrodes. For example this may make it possible to modulate the profile of the membrane on regions located in it, and to obtain more different profiles.

Figure 4:
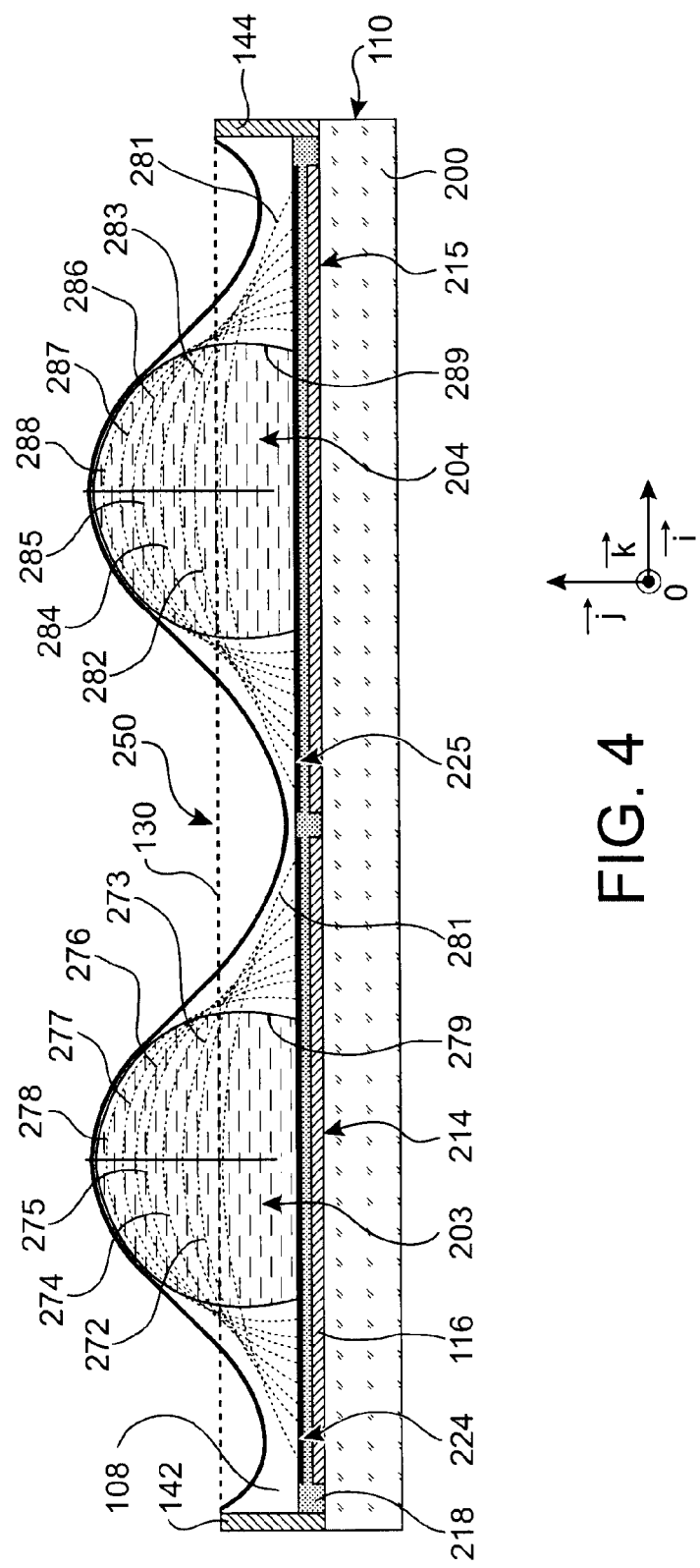
FIG. 4 shows a first variant of the optical device according to the invention, provided particularly with a containment with a flexible wall filled with at least one first liquid and at least one second fluid, comprising several drops, the corresponding shapes of which can be modulated by electrowetting.

One variant of the example embodiment described above with reference to FIGS. 1A and 1B, is shown in FIG. 4. According to this variant, the volume V between the membrane 130 and the support 110 includes several drops 203 and 204 of liquid 102, distributed facing electrodes 214, 215 respectively of the support 110. The electrodes 214, 215 may be in a matrix layout. For this variant of the device, the support 110 comprises a substrate 200, for example based on glass, silicon or plastic, on which the electrodes 214, 215 are arranged, for example in matrix form. These electrodes 214, 215 may be separate or distinct conducting zones formed from the conducting layer 116 and covered by a layer of dielectric material 218. The drops 203 and 204 are supported on zones 224, 225 respectively of the layer of dielectric material 218. In this example, the wettability of the dielectric material 218 by the second liquid 108 may be naturally low. "Naturally" means even when the electrodes 214 and 215 are not polarised. The wettability of the zones 224, 225 by the second liquid 108 is different from the wettability of the remainder of the layer of dielectric material 218. In the case in which the second liquid 108 is water, the dielectric material 218 may be hydrophobic in nature. The wettability of the zones 224, 225 may be different from the wettability of the remainder of the layer of material 218, for example formed by a localised chemical treatment or a UV insolation localised on the layer of dielectric material 218.

According to one possibility (not shown), the zones 224, 225 may be star-shaped. This shape can improve the support of the drops 203 and 204 with respect to the electrodes 214 and 215.

The corresponding potentials applied to the electrodes 214, 215 will be modulated to enable the drops 203, 204 to adopt different positions and the membrane 130 to adopt different profiles. In particular, FIG. 4 shows a position for which the electrodes 214 and 215 are polarised by corresponding potentials equal to for example approximately 100V. In this state of polarisation of the electrodes 214 and 215, the profiles or corresponding shapes (for example hemispherical) denoted 279 and 289 of the drops 203 and 204, and the drops apply a pressure on the membrane 130. The membrane 130 at least partially matches the shape of the drops 203 and 204 and it may have a sinuous shape around or with respect to its rest position (indicated by a discontinuous line reference 250 shown in FIG. 4) for which the electrodes 214 and 215 are not polarised. This FIG. 4 also shows other example shapes that the drops 203 and 204 may adopt (these other shapes being represented for the drop 203 by discontinuous lines reference 271, 272, 273, 274, 275, 276, 277, 278 and for drop 204, by discontinuous lines reference 281, 282, 283, 284, 285, 286, 287, 288), for other polarisation states of the electrodes 214 and 215. For at least several of the other polarisation states, the membrane 130 may have a different shape or profile from the shape or profile applicable for the state of the device in which the electrodes 214 and 215 are not polarised (the shapes of the membrane for said other polarisation states are not represented in FIG. 4).

Figure 5:
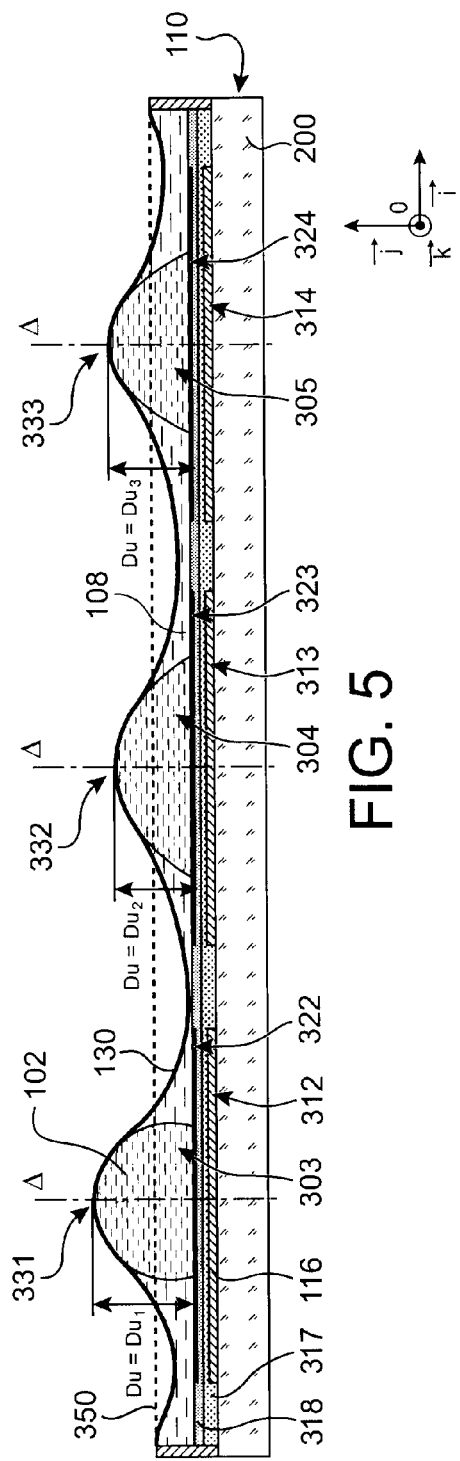
FIG. 5 shows a second variant of the device according to the invention, provided particularly with a flexible-walled liquid containment, comprising several drops the corresponding shapes of which can be electrically controlled independently of each other.

Another example of the actuation device according to the invention uses electrodes controlled independently of each other or that can be set to corresponding potentials different from each other by polarisation control means. An example of such a device including drops 303, 304, 305 of the first liquid 102 between the membrane 130 and the support 110, the drops being arranged in matrix form and supported on electrodes 312, 313, 314 arranged in matrix form and controlled independently of each other, is illustrated in FIG. 5. Drops 303, 304, 305 are supported on zones 322, 323, 324, separate from or distinct from a dielectric material layer 318. In a case in which the liquid 102 is oil and the second liquid 108 is water, the dielectric material layer 318 may be formed based on a hydrophobic dielectric material. The wettability of the zones 322, 323, 324 by the second liquid 108 may be different from the wettability of the remainder of the dielectric layer 318. To achieve this, the zones 322, 323, 324 may be zones in the layer of dielectric material 318 that were treated for example chemically or by UV insolation. The dielectric layer 318 is supported on another dielectric layer 317, covering the electrodes 312, 313, 314.

This device is in a polarisation state for which the electrodes 312, 313, 314, are set to potentials U=U1, U'=U2, U"=U3 respectively, where U1≠U2≠U3. Since the polarisations of the electrodes 312, 313, 314 are different, the shapes of the drops 303, 304, 305 are different, for example different external surfaces and/or contact surfaces and/or height at their centre, and apply different stresses on the membrane 130. The drops 303, 304, 305 are in contact with the support 110 and the membrane 130 and hold a first zone 331 of the membrane 130 at a first distance DU=DU1 from the support 110 dependent on the potential U, a second zone 332 of the membrane 130 at a second distance DU'=DU2 from the support 110 dependent on the potential U', a third zone 333 of the membrane 130 at a third distance DU"=DU3 from the support 110 dependent on the potential U", where DU1≠DU2≠DU3.

The use of a matrix of drops for which deformations are controlled by a matrix of electrodes provides a means for applying stresses on several regions of the membrane 130. This makes it possible to force the membrane 130 into many different profiles. It can also locally modify the profile of the membrane 130.

Figure 6:
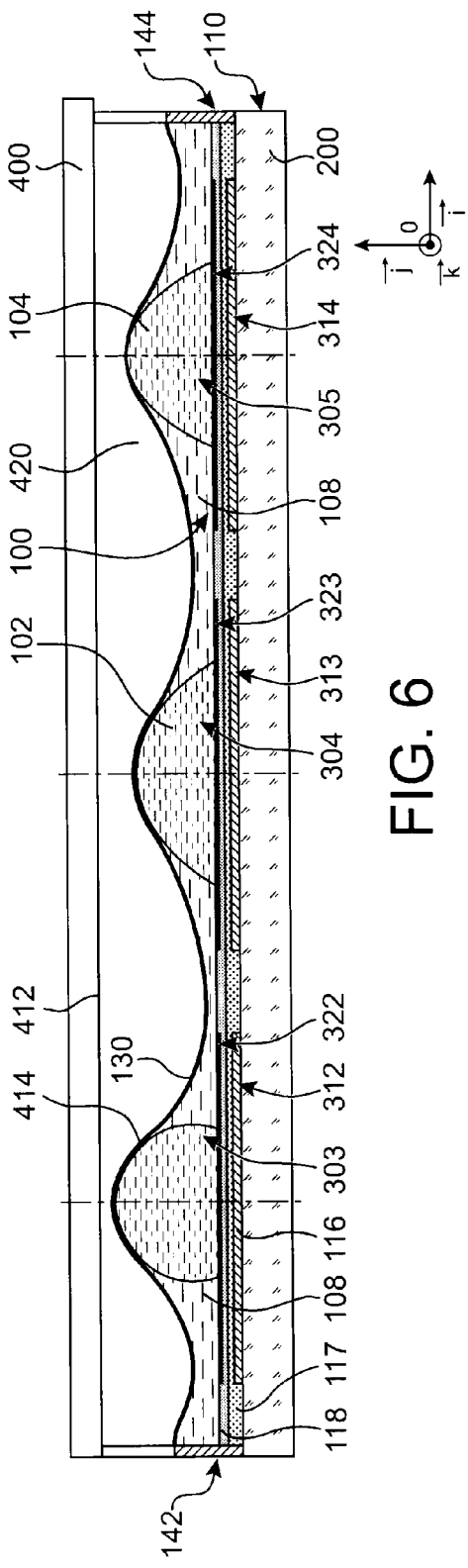
FIG. 6 shows a third variant of the device according to the invention, provided particularly with a protection cover.

According to one variant (FIG. 6) of the device in FIG. 5, the device may also comprise an encapsulation layer or a protection cover 400 protecting the flexible membrane 130 from the external environment. The protection cover 400 may be located facing the support 110, and be arranged so as to hold the containment 100 full of liquids 102 and 108 in a closed space 420. This closed space 420 may include a gas, for example inert gas or air. In one particular case in which the actuation device is integrated into an adaptative optical device, the cover 400 may be based on a transparent material such as a plastic material or glass and may be supported on the walls 142, 144 to which the membrane 130 is attached. The device may also comprise one or several anti-reflecting layers. The cover 400 may comprise or may be coupled with or covered with a first anti-reflecting layer 412. The first anti-reflecting layer 412 may be facing or opposite the membrane 130. The membrane 130 may also comprise or be coupled with or covered with a second anti-reflecting layer 414 (FIG. 6). The support 110 may also comprise or be coupled with or covered with a third anti-reflecting layer.

Figure 7:
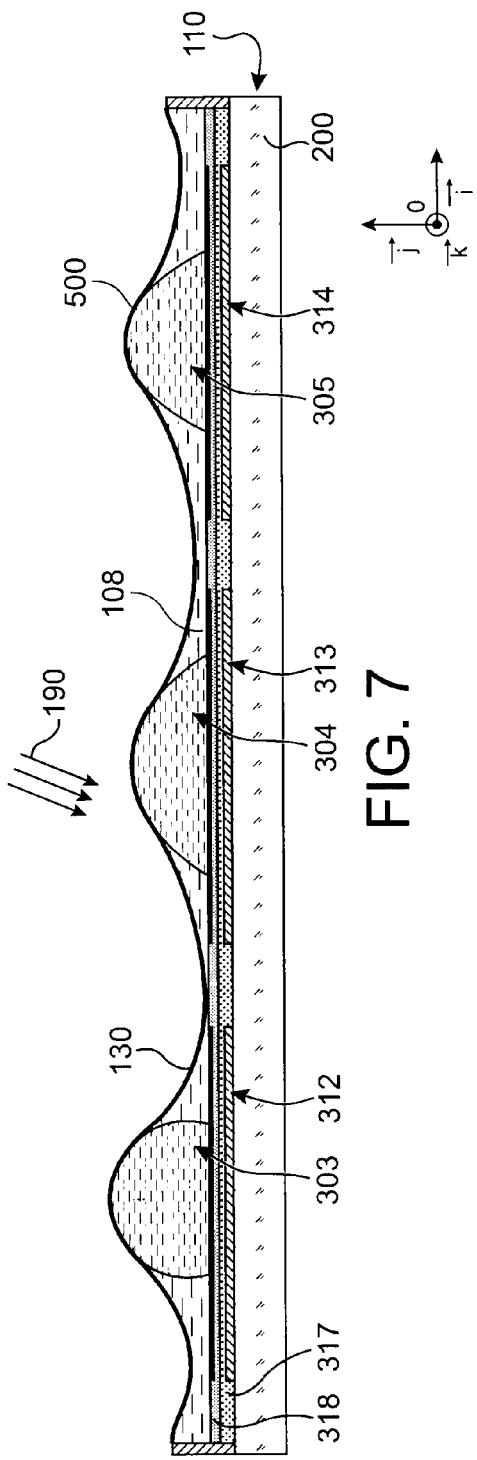
FIG. 7 shows a fourth variant of the device according to the invention, provided particularly with a containment, comprising at least one first liquid and at least one second fluid, the containment having a flexible wall and reflecting light rays.

According to one particular embodiment, the actuation device may be integrated into or belong to an optical device or an adaptative optical device, for which the properties may be modulated by electrowetting, and that is designed to operate in transmission of light rays 190. The membrane 130 may comprise or be coupled with or covered with at least one layer 500 reflecting light rays 190. In this case, the membrane 130 and the reflecting layer 500 form an optical system operating in reflection, and for example acts as one or several mirrors or a matrix of mirrors for which the shape of the reflecting surface can be modulated by deformation of the membrane by electrowetting. The reflecting layer 500 may for example be made based on a metal such as gold or aluminium or silver or it may be formed by a stack of sub-layers that may for example be dielectric (FIG. 7).

Figure 8:
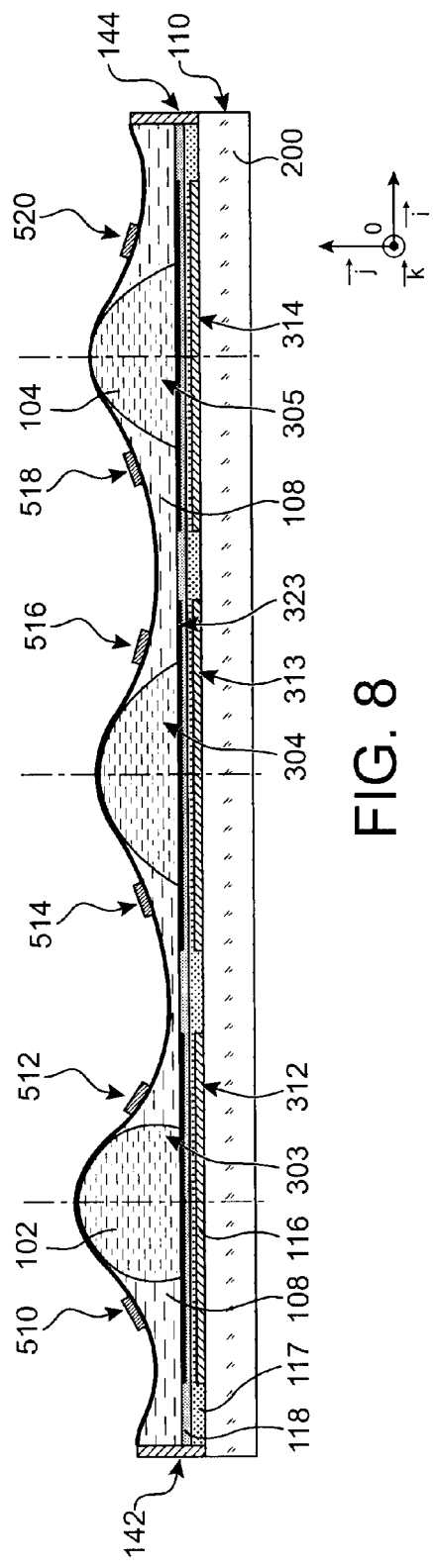
FIG. 8 shows a fifth variant of the device according to the invention, provided particularly with a containment, comprising at least one first liquid and at least one second fluid, the containment having a flexible wall provided with electrodes.

According to one variant embodiment of the device shown in FIG. 8, the membrane 130 may be provided with a plurality of electrodes 510, 512, 514, 516, 518, 520 facing the electrodes 312, 313, 314 respectively of the support 110. In the case in which the optical device is designed to operate in transmission, the electrodes may be formed for example based on a transparent material such as ITO and may be covered with an insulating material. In such a device, the profile of the membrane 130 may be modulated by a combined effect, firstly of the deformation(s) of drops 303, 304, 305 of the first liquid 102, induced by variations in the polarisation of the electrodes 312, 313, 314 of the support 110, and secondly by interaction or attraction between the polarised electrodes 312, 313, 314 and the electrodes 510, 512, 514, 516, 518, 520, located on the membrane 130.

Figure 9:
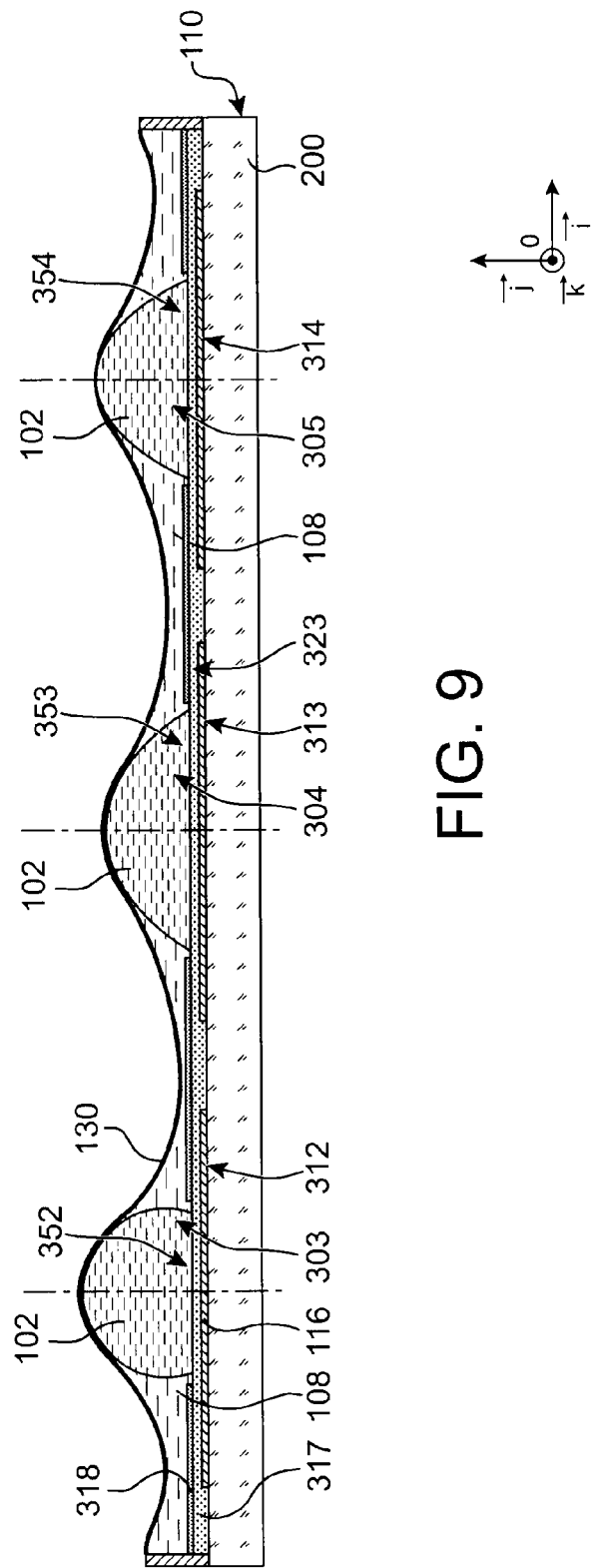
FIG. 9 shows a sixth variant of the device according to the invention, provided particularly with a containment, comprising at least one first liquid and at least one second fluid, the containment having a flexible wall provided with electrodes.

One variant of the device described above with reference to FIG. 5 is shown in FIG. 9. The drops 303, 304, 305, of the first liquid 102, for example oil, are arranged in matrix form facing the electrodes 312, 313, 314 and are placed in openings 352, 353, 354 in a layer of perforated hydrophobic dielectric material 318. The perforated hydrophobic dielectric layer 318 and the drops 303, 304, 305 are supported on another dielectric layer 317 covering the electrodes 312, 313, 314. The wettability of the dielectric layer 318 by the second liquid 108, for example water, and the wettability of the other dielectric layer 317 are different.

The device according to the invention is not limited to a first non-conducting or slightly conducting liquid and to a second conducting liquid. According to one variant of the actuation device, the membrane may be displaced by using a liquid volume comprising drops of a first conducting liquid and a second non-conducting liquid. According to this variant, the drops of the first liquid may for example be drops of water, for example tap water or water charged with ions, while the second liquid may for example be oil or an insulating liquid immiscible with water.

Figure 10A:
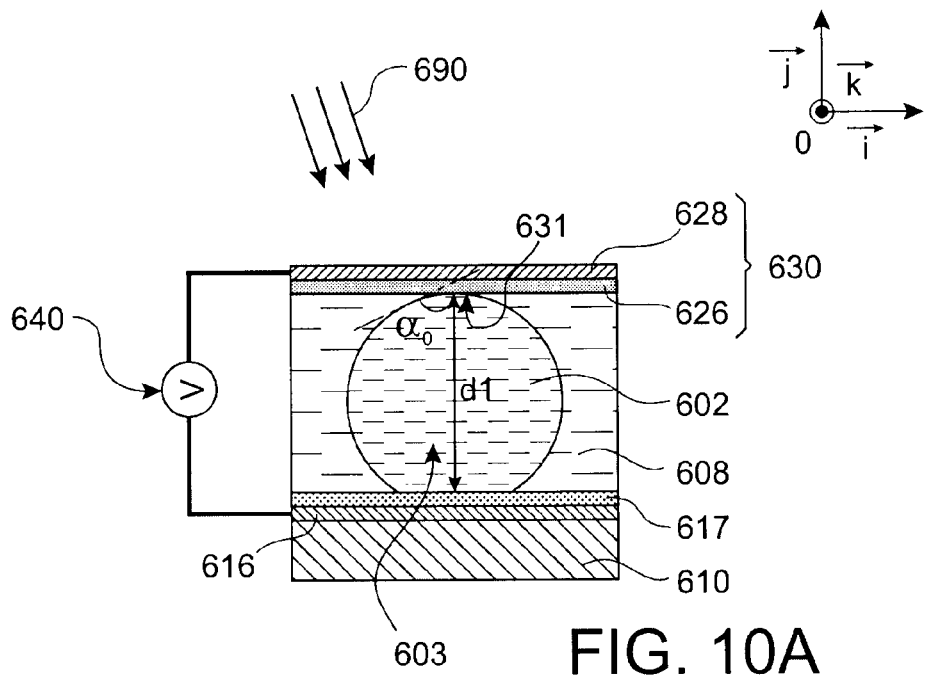
FIGS. 10A and 10B show a seventh variant of the device according to the invention, provided particularly with a containment, comprising at least one first liquid and at least one second fluid, the containment being formed between a conducting support and a flexible membrane comprising a layer acting as an electrode.
Figure 10B:
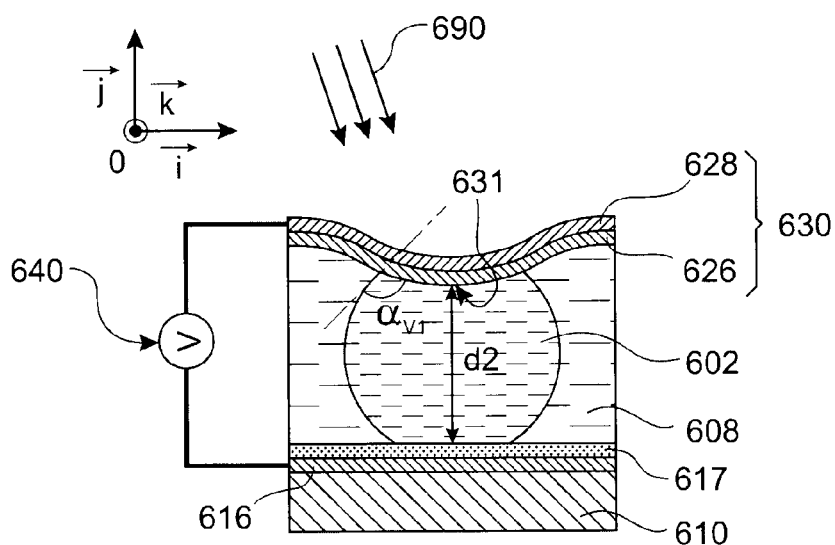

Another example of an adaptative optical device comprising a flexible membrane actuation device deformable by electrowetting is shown in FIGS. 10A and 10B. This optical device also uses a control over the curvature of a thin membrane by action of a drop for which the wettability or the shape is itself controlled by the electrowetting phenomenon. The actuation device comprises a conducting support 610, a flexible membrane 630 attached to the conducting support 610 (the means for attaching the support and the membrane 630 not being shown), cooperating with the support 610 to form a closed containment with volume V. The closed containment is filled with a first liquid 602, for example water in the form of a drop and a second liquid 608, for example oil. The first liquid 602 and the second liquid 608 are preferably immiscible. The drop 603 can be supported on a first dielectric layer 617 of the support 610. The first dielectric layer 617 may be supported on a first conducting layer 616 forming a first electrode.

Electrical means are used to modulate the profile of the membrane 630 by controlling the shape of the drop 603. The membrane 630 is formed of a second conducting layer 628 capable of acting as a counter electrode, coupled with a second dielectric material layer 626. The second layer of dielectric material 626 is in contact with the drop 603. In this example, the wettability of the second dielectric layer 626 by the first liquid 602 is naturally low. For example, in the case in which the first liquid 602 is water, the second dielectric layer 626 for example may be hydrophobic in nature. The thickness of the membrane 630 is relatively low, for example between 10 nanometers and 1 micrometer, sufficiently to be deformed by capillary forces applied at the triple line at the interface between the first liquid 602, the second liquid 608 and the first dielectric layer 617. The first conducting layer 616 of the support 610 and the second conducting layer 628 of the membrane 630 are connected to a power supply 640 that can apply a voltage V between the first conducting layer 616 of the support 610 and the second conducting layer 628.

The device may adopt at least one first "rest" position (FIG. 10A) in which the liquid drop 602 and the membrane 630 have given corresponding shapes. This rest position may be adopted for a voltage V such as V=V1=0 volts between the conducting layer 616 and the second conducting layer 628. In the rest position, the liquid drop 602 may have a very small contact area with the second hydrophobic dielectric layer 626 and forms a very large contact angle $\alpha_v = \alpha_0$, for example between 60° and 110°. In this position, the membrane 630 is not subject to a capillary stress by the liquid drop 602 or a stress too low to be deformed. In the rest position, the membrane 630 may be parallel to a principal plane of the support 610. In the rest position, a region 631 of the membrane 630 in contact with the drop 630 is at a first distance $d_1$ from the support 610.

By varying the voltage V, the wettability of the dielectric layer 626 by the first liquid 603 can be modulated.

When a voltage V is applied, for example such that V>0 between the first conducting layer 616 of the support 610 and the second conducting layer 628 of the membrane, the drop 603 tends to deform such that the contact area between the drop 603 of liquid 602 increases under the effect of electrowetting. The contact angle $\alpha_v$ changes to a value $\alpha_v$ less than $\alpha_0$. The deformation of the drop 603 of liquid 602 creates a mechanical stress on the membrane 630. A portion of the membrane tends to displace and to move towards the support 610.

The device can adopt at least one second position (FIG. 10B) when a voltage V=V2 (where V2>0) is applied between the second conducting layer 628 and the first conducting layer 616. In this second position, the membrane 630 comprises a curved profile. In the second position, the region 631 of the membrane 630 in contact with the drop 630 is at a second distance d2 from the support 610, such that d2<d1. The membrane 630 moved closer to the support 610 between the first position or rest position and the second position.

In one case, for example in which the membrane 630 is covered by one or several light ray reflecting layers or comprises one or several light ray reflecting layers, such an adaptative optical device is designed to operate in reflection of light rays.

Figure 11A:
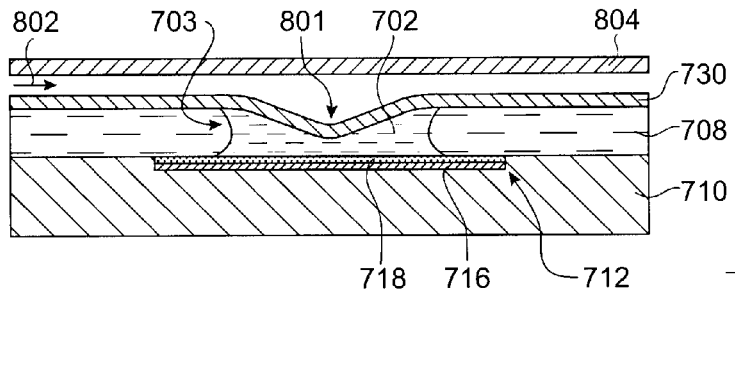
FIGS. 11A and 11B show a valve device according to the invention, actuated using a flexible membrane with a profile that can be modulated by electrowetting.
Figure 11B:
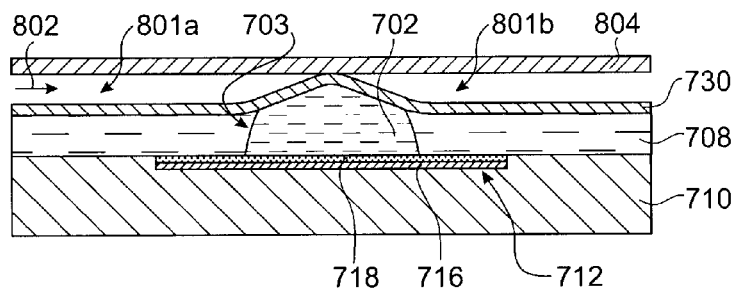

A valve device or a device forming a valve comprising an actuation device according to the invention with a flexible membrane deformable by electrowetting, is shown in FIGS. 11A and 11B. This device comprises in particular a support 710, a flexible membrane 730 attached to the support 710 (the means for attaching the support and the membrane not being shown). The membrane 730 forms a closed containment with the support 710 with a volume V filled with a first liquid 702 in the form of a drop 703 and a fluid, for example a second liquid 708, the first liquid and the second liquid being immiscible. Electrical means are used to modulate the profile of the membrane 730, by controlling the shape of the drop 703. In this example, the drop 703 is placed facing at least one electrode 712 integrated into the support 710. The electrode 712 may be formed from a conducting layer 716 and may be covered by at least one dielectric layer 718 with which the drop 703 may be in contact. The device may also comprise at least one counter electrode, for example integrated into the support or the membrane. The membrane 730 in this example is located between the support 710 and a zone 804, for example a rigid layer, attached to the support 710 (the means for attaching the support and the rigid layer not being shown). The rigid zone 804 may be at a distance e from the membrane 730, for example between 0.5 micrometers and 100 micrometers. The zone 804 and the membrane 730 at a distance from each other form a channel 801 through which a fluid 802 can circulate or through which a fluid 802 can pass. The drop 703 of liquid for which the contact angle is varied by electrowetting can actuate or displace the membrane 730. The device may adopt several positions by electrowetting, depending on the manner in which the electrode 712 is polarised. For a first potential applied to electrode 712, the device may adopt at least one first position (FIG. 11A) in which the membrane 730 and the layer 804 are not in contact. In this first position, the channel 801 is open. In the first position, the fluid 802 can pass through the channel 801.

For a second potential applied to the electrode 712 different from the first potential, the device may adopt at least one second position (FIG. 11B) in which the membrane 730 has a profile different from the first position and in which the zone 804 and the membrane 730 are in contact. In the second position, the channel 801 is closed and comprises two separate parts 801a and 801b. In this second position or when the channel 801 is closed, circulation of a fluid 802 through the channel 801 is prevented and the fluid 802 is kept in one of the two parts 801a and 801b.

Figure 12A:
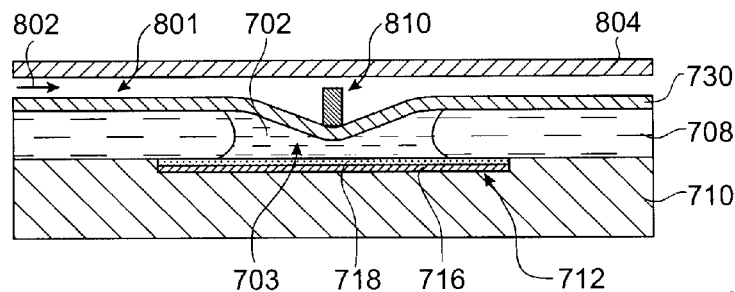
FIGS. 12A and 12B show a variant of the valve device according to the invention, actuated using a flexible membrane with a profile that can be modulated by electrowetting.
Figure 12B:
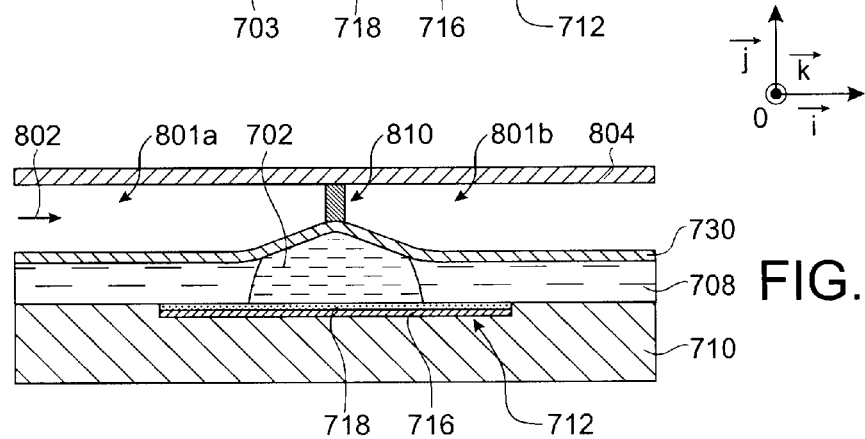

A variant of the example device described above with reference to FIGS. 11A and 11B, is shown in FIGS. 12A and 12B. In this variant, a rigid element 810 is attached to the membrane 730 and is located between the membrane 730 and the layer 804. This element 810 forms a wall with a non-zero angle with the membrane 730 and with the layer 804, for example an angle of 90° with the layer 804. The device is capable of adopting at least one first position (FIG. 12A) or open channel 801 for which neither the element 810 nor the membrane 730 are in contact with the zone or layer 804. In this first position, the channel 801 is open. In the first position, the fluid 802 can pass through the channel 801. The membrane 730 can also adopt at least one second position (FIG. 12B) for which the element 710 and the zone 804 are in contact. In this second position, the channel 801 is closed. In this second position, circulation of the fluid 802 through the channel 801 is prevented, and the fluid 802 is kept in one of the two parts 801a and 801b of the channel 801.

Figure 13A:
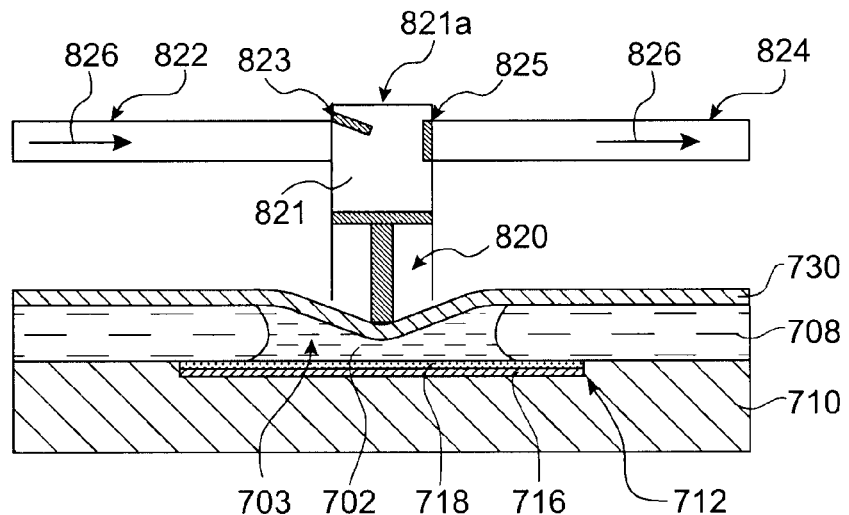
FIGS. 13A and 13B show a pump device according to the invention, actuated using a flexible membrane with a profile that can be modulated by electrowetting.
Figure 13B:
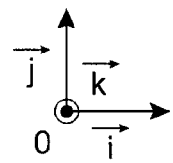
Figure 13B:
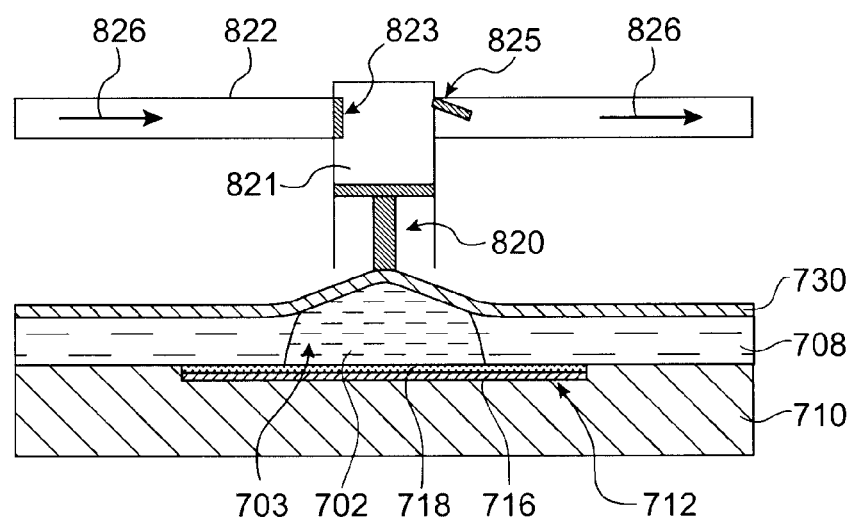

A pump device or a device forming a pump comprising an actuation device according to the invention with a flexible membrane deformable by electrowetting is shown in FIGS. 13A and 13B. The actuation device comprises a support 710, a flexible membrane 730 attached to the support 710 (the means for attaching the support and the membrane not being shown). The membrane 730 cooperates with the support 710 to form a closed containment with volume V filled with a first liquid 702 in the form of at least one drop 703 and a fluid, for example a second liquid 708, the first liquid and the second liquid being immiscible. The liquid drop 703 for which the shape may be modified by electrowetting can be used to actuate or displace the membrane 730. Electrical means are used to modulate the profile of the membrane 730, by controlling the shape of the drop 703. The drop 703 is placed facing an electrode 712 integrated into the support 710. The electrode 712 is formed from a conducting layer 716 and may be covered by at least one dielectric layer 718. The drop 703 may be in contact with the membrane 730 and the dielectric layer 718. The actuation device may also comprise at least one counter electrode, for example integrated into the support or the membrane. The actuation device may adopt several positions, depending on the manner in which the electrode 712 is polarised. In this example, an element forming a piston 820 is attached to the membrane 730. This piston 820, fixed to the membrane 730, is capable of moving in the body of a work chamber 821, and sliding along the walls of this chamber 821. The piston 820 may for example displace in a direction forming a non-zero angle, for example 90° with a principal plane of the support 710. The piston 820 is displaced particularly with respect to the bottom 821a of the work chamber 821.

The work chamber 821 comprises a first valve 823 and a second valve 825 facing each other and located at the level of said walls. A first conduit 822 is attached to the chamber 821 and separated from this chamber by a first valve 823. A second conduit 824 is attached to the chamber 821 and separated from it by the second valve 825. A fluid 826, for example a liquid, is designed to pass through the first conduit 822 and then to be drawn into the chamber and then injected into the second conduit 824. The first conduit 822 and the second conduit 824 may for example be parallel to a principal plane of the support 710.

FIG. 13A shows a first position of the device in which the liquids 702 and 708 induce a first stress on the membrane 730, in which the piston 820 is kept at a first distance from the bottom 821a of the chamber 821. In this first position, the first valve 823 is open and the second valve 825 is closed. A fluid 826 circulating in the first conduit 822 is drawn towards the chamber 821.

FIG. 13B shows a second position of the device in which the drop 703 induces a second stress on the membrane 730, which holds the piston 820 at a second distance from the bottom 821a of the chamber 821. In this second position, the first valve 823 is closed, while the second valve 825 is open. The fluid 826 is injected in the second conduit 824.

Figure 14A:
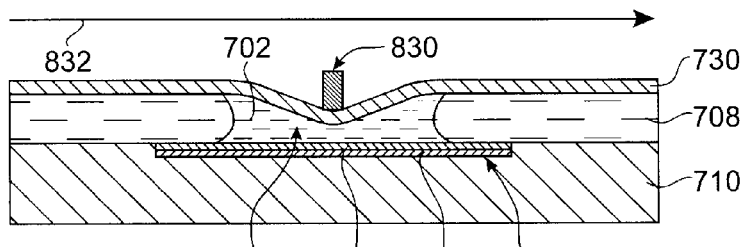
FIGS. 14A and 14B show an optical switch device according to the invention, that can be open and closed under the control of a flexible membrane with a profile that can be modulated by the electrowetting phenomenon.
Figure 14B:
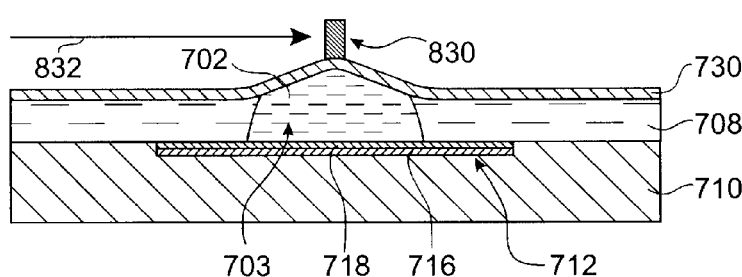

FIGS. 14A and 14B show an optical switch device comprising an actuation device according to the invention with a flexible membrane deformable by electrowetting. The actuation device in this example comprises a support 710, a flexible membrane 730 attached to the support 710 (the means for attaching the support and the membrane not being shown). The membrane 730 cooperates with the support 710 to form a closed containment with volume V filled with a first liquid 702 in the form of at least one drop 703 and a second fluid, for example a second liquid 708, the first liquid and the second liquid being immiscible. The drop 703 is placed facing an electrode 712 that may be integrated into the support 710. The electrode 712 may be formed from a conducting layer 716 and may be covered by at least one dielectric layer 718 with which the drop 703 can come into contact. The drop 703 of liquid for which the shape can be modified by the electrowetting can be used to actuate or displace the membrane 730. The actuation device may adopt several positions, depending on the manner on which the electrode 712 is polarised. The support 710 and the membrane 730 are arranged close to a beam 832 of light rays. The beam of light rays 832 may be such that it propagates close to the membrane 730, along the membrane 730 in a direction parallel to the principal plane of the support 710.

An element 830 is attached to the membrane 730. This element 830 forms a wall making a non-zero angle with the membrane 730. According to a first possibility, the element 830 may be covered by a material absorbing light rays. According to a second possibility, the element 830 may be covered with a material capable of reflecting light rays. The actuation device may adopt at least one first position (FIG. 14A), in which the element 830 does not intersect the path of the beam of light rays 832. In this first position, the device acts as a "passing" optical switch. The device can adopt at least one second position (FIG. 14B) in which the element 830 intersects the path of the light beam 832 or intercepts the light beam 832. In the case in which the element 830 comprises a reflecting coating, this element 830 can be used to reflect the beam of light rays 832. In the case in which the element 830 comprises a coating that absorbs light rays, the element 830 can stop the trajectory and absorb the light beam 832.

Figure 15A:
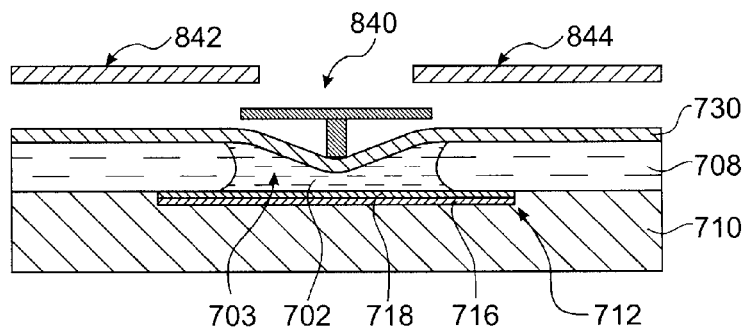
FIGS. 15A and 15B show an electrical switch device according to the invention, that can be open and closed under the control of a flexible membrane with a profile that can be modulated by the electrowetting phenomenon.
Figure 15B:
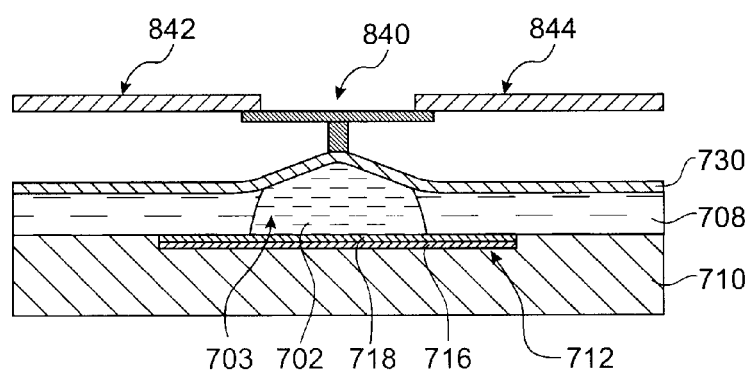

FIGS. 15A and 15B show an electrical switch device comprising an actuation device according to the invention with a flexible membrane deformable by electrowetting. The actuation device in this example comprises a support 710, a flexible membrane 730 attached to the support 710 (the means for attaching the support and the membrane not being shown). The membrane 730 cooperates with the support 710 to form a closed containment with volume V filled with a first liquid 702 in the form of at least one drop 703 and a second fluid, for example a second liquid 708, the first liquid 702 and the second liquid 708 being immiscible. The drop 703 is placed facing an electrode 712 integrated into the support 710. The electrode 712 is formed from a conducting layer, for example based on a metal such as gold or aluminium, and may be covered with a dielectric layer 718. The drop 703 may be in contact with the membrane 730 and the dielectric layer 718. The drop 703 of liquid for which the shape is modified by electrowetting can be used to actuate or displace the membrane 730. The actuation device may adopt several positions, depending on the manner in which the electrode 712 is polarised. In this example, an element 840 is attached to the membrane 730. This element 840 conducts electricity and forms a contactor. At least one first conducting zone 842 and at least one second conducting zone 844 capable of carrying an electric current are arranged above the membrane 730 and the contactor 840. The actuation device can adopt at least one first position (FIG. 15A) in which firstly the contactor 840 and secondly the conducting zones 842 and 844 are not in contact. In this first position, the conducting zones 842 and 844 are not electrically connected. In the first position, the device acts as an "open" switch. A current passing through one of the two conducting zones cannot reach the other of these two zones 842 and 844. The actuation device can adopt at least one second position (FIG. 15B), in which firstly the contactor 840 and secondly the conducting zones 842 and 844 are in contact. In this second position, the conducting zones 842 and 844 are electrically connected through the contactor 840. In the second position, the device acts as a "closed" switch. A current passing through one of the two conducting zones 842 and 844 can reach the other of these two zones 842 and 844.

A method for making an example actuation device according to the invention of the type shown with reference to FIG. 9 will now be described with reference to FIGS. 16A-16G.

Figure 16A:
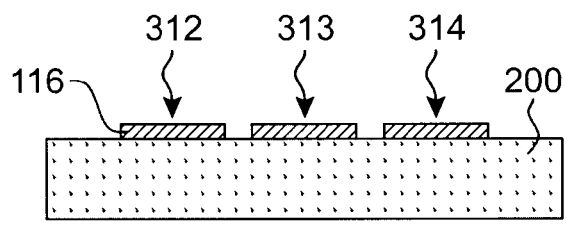
FIGS. 16A to 16G, and 17A-17C show the steps in a method of manufacturing an actuation device according to the invention.

For example, the initial material may be a substrate 200, for example based on glass or based on a plastic material, on which a conducting layer 116 for example based on ITO is deposited. Patterns are made in this conducting layer 116, for example by means of at least one photolithography step so as to define a matrix of electrodes 312, 313, 314 and connection lines for these electrodes (FIG. 16A). The next step is to deposit a first layer of dielectric material 317, such as a layer of silicon oxide or $Si_3N_4$ so as to cover the electrodes 312, 313, 314.

Figure 16B:
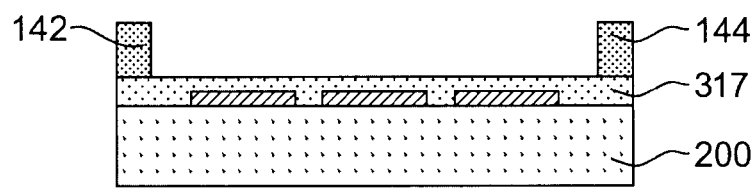

The next step is to deposit a layer of photosensitive resin with a thickness for example between 10 µm and 100 µm, in which patterns are formed by photolithography to make pads 142 and 144 at the ends of the support (FIG. 16B). A second dielectric layer 318 is then deposited, for example a hydrophobic layer.

Figure 16C:
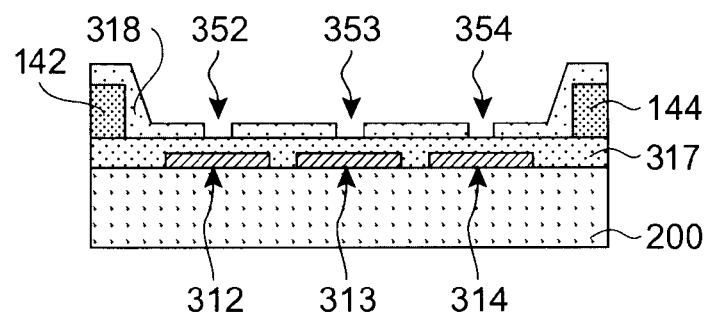

According to a first possibility, a plurality of openings 352, 353, 354 are made in this second dielectric layer 318 facing the electrodes 312, 313, 314, so as to expose the first dielectric layer 317. The openings 352, 353, 354 could be used as locations for drops 303, 304, 305 respectively (FIG. 16C).

Figure 16D:
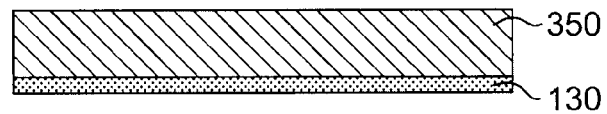
Figure 16E:

A thin layer is deposited on the back face of a second substrate 350 for example based on silicon, with a thickness of between 10 nanometers and 10 micrometers that will act as membrane 130. The thin layer 130 may for example be based on $Si_3N_4$ (FIG. 16D). The next step is then to make a large opening 352 in the center of the second substrate 350 by etching the front face, for example by chemical etching based on KOH or plasma etching, so as to expose a large surface area of the layer 130 (FIG. 16E).

A hydrophobic treatment, for example using an amorphous fluoropolymer, may possibly be made on a face of the layer 130 called the "lower" face that is not in contact with the substrate 350.

Figure 16F:
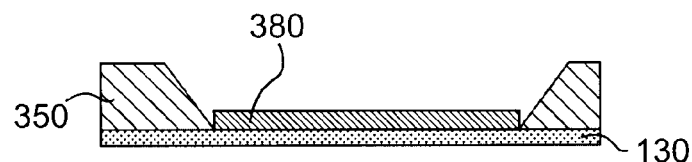

A counter electrode coupled with the membrane 130 or integrated into the membrane 130 may be formed on the other face of the layer 130 called the "upper" face, possibly by deposition and then etching of a metallic layer 380 (FIG. 16F).

Figure 16G:
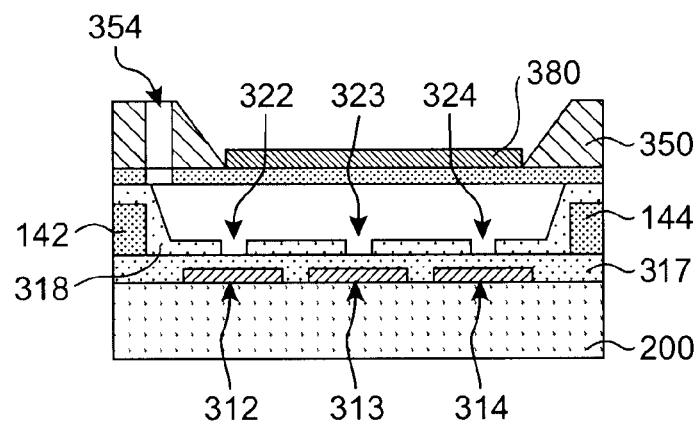

The next step is to assemble the second substrate 350 on the pads 142 and 144 of the substrate 200, for example by gluing, such that the membrane 130 is placed facing the zones 322, 323, 324. At least one hole 354 through the second substrate 350 and the membrane 130 can then be made close to the pads 142 and 144. This hole 354 may be used as an injection hole to fill the component thus formed with a first liquid 102 and a second liquid 108 (FIG. 16G).

Figure 17A:
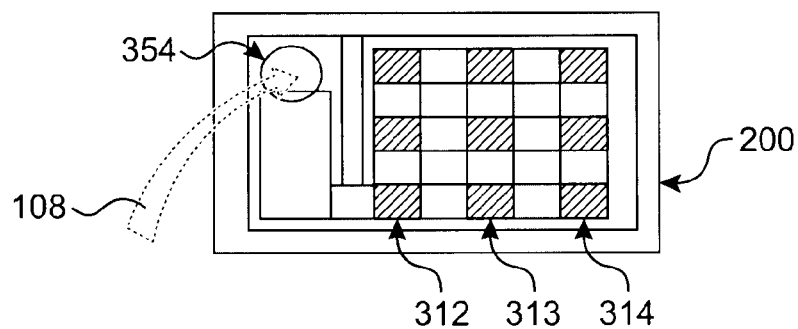
Figure 17B:
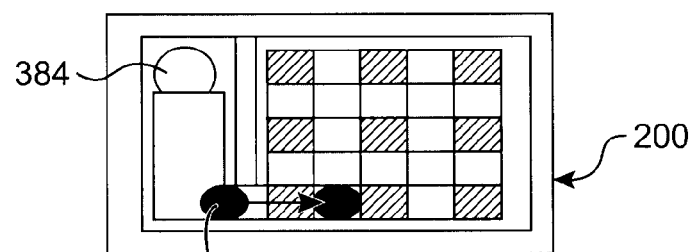
Figure 17C:
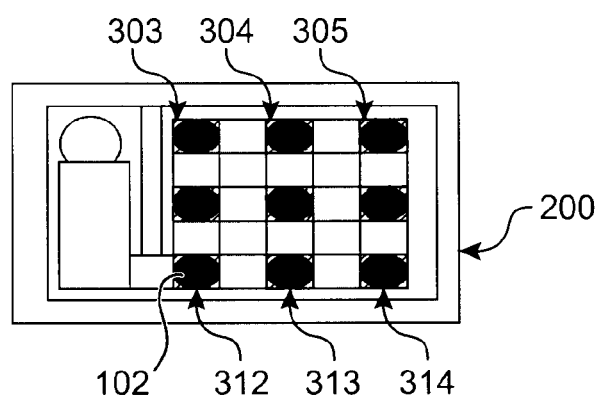

An example of the component filling method will now be described. This filling can be done by electrically connecting electrodes 312, 313, 314 to polarisation means. The component is then filled with the second liquid 108. This filling can be done by injection through the injection hole 354 by pressure or by vacuum filling (FIG. 17A, the component being shown in a top view, injection of the second liquid being shown diagrammatically by an arrow 108). The component is then filled with the first liquid 102 through the hole 354. The drops 303, 304, 305 are then formed from the first liquid 102 facing the electrodes 312, 313, 314. This is done by applying potentials on the electrodes 312, 313, 314. The liquid volume 102 is separated into drops 303, 304, 305 by electrowetting, as described for example in the document "Toward Digital Microfluidic Circuits: Creating, Transporting, Cutting and Merging Liquid Droplets by Electrowetting-Based Actuation", S. K. Cho, S.-K. Fan, i-l. Moon, and C.-J Kim, IEEE Conf. MEMS, Las Vegas, Nev., January 2002, pp. 32-52. These drops 303, 304, 305 are displaced as far as their electrodes 312, 313, 314 by electrowetting. Once the component is filled, the injection hole 354 may be closed off. This operation can be done by gluing or pressing a sealed plug. During these filling operations, the deformable membrane 130 may possibly be made rigid. This is done by using a resin or glue that is deposited on the component surface. After filling, this resin layer is removed. The membrane can also be made rigid by gluing a rigid plate before filling. This plate may then be separated or etched after filling and closing the hole 354.

Filling may also be done without polarising the electrodes 312, 313, 314. In one case the wettability of the zones or pads 322, 323, 324 by the first liquid 102 is naturally high, while the wettability of layer 317 by the first liquid 102 is low. When the first liquid 102 is injected into the hole 354, the drops 303, 304, 305 form automatically on the pads 322, 323, 324.

Figure 18A:
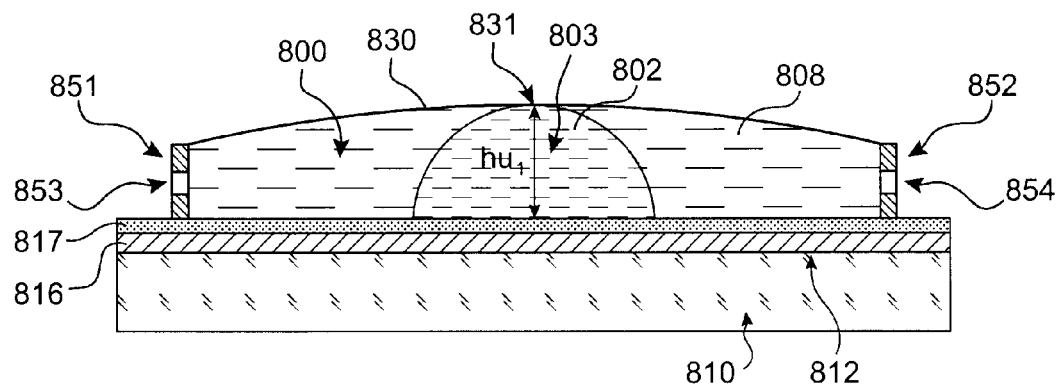
FIGS. 18A to 18B show a variant of a flexible membrane actuation device that can be modulated by electrowetting.
Figure 18B:
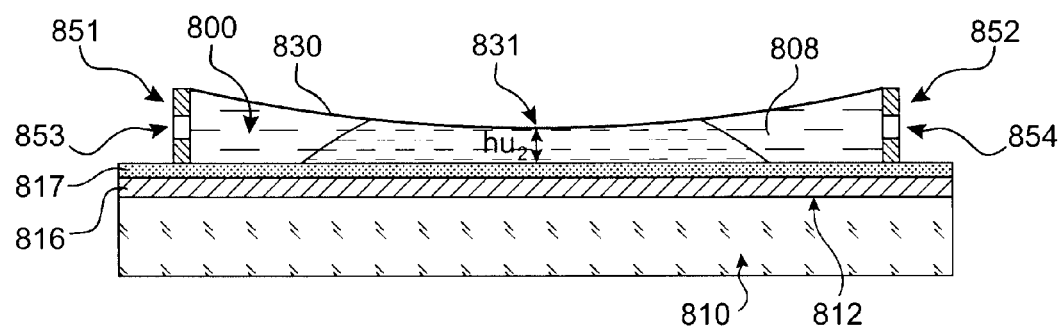

FIGS. 18A and 18B show one variant of the actuation device according to the invention with a flexible membrane deformable by electrowetting. In particular, this device includes a support 810, and a flexible membrane 830 attached and kept at a distance from the support 810 by pads 851, 852. The membrane 830 cooperates with the support 710 and the pads 851, 852 to form a containment 800 with volume V filled with a first liquid 802 in the form of a drop 803 and a second fluid, for example a second liquid 808 with volume V2, the first liquid 802 and the second liquid 808 being immiscible. The pads comprise openings 853, 854 opening up on reservoirs (not shown). In this example, the containment 800 is not closed.

Electrical means are used to modulate the profile of the membrane 830 by controlling the shape of the drop 803. The drop 803 is placed facing an electrode 812 integrated into the support 810. The electrode 812 may be formed from a conducting layer 816 and covered by at least one dielectric layer 817 with which the drop 803 may be in contact. The liquid drop 803 for which the shape is varied by electrowetting can actuate or displace the membrane 830. The membrane 830 may adopt different positions by electrowetting, depending on the manner in which the electrode 812 is polarised. In this example in which the containment 800 is open, the membrane may change from one position to another with a variable volume of the second liquid 808.

For a first potential applied to the electrode 812, the device can adopt at least one first position (FIG. 18A) in which the membrane 830 has a first curved profile. In this first position, the drop 803 applies a pressure on the membrane and keeps a zone 831 of the membrane 830 at a height hu1 from the insulating layer 817 greater than the height of the pads 851, 852.

For a second potential different from the first potential applied to the electrode 812, for example less than the first potential, the device can adopt at least one second position (FIG. 18B) in which the membrane 830 has a second curved profile opposite to the first profile in the first position. In this first position, the drop 803 applies a pressure on the membrane and keeps a zone 831 of the membrane 830 at a height hu2 from the insulating layer 817 less than the height of the pads 851, 852.

A change from the second position to the first position may force part of the volume V2 of the second liquid 808 through the openings 853, 854, from the containment 100 to the reservoirs (not shown).

A change from the first position to the second position may force part of the volume V2 of the second liquid 808 through openings 853, 854, from the reservoirs to the containment 100 (not shown).

The invention is not limited to a containment filled with two liquids. According to one variant, the invention also uses an actuation device comprising a support, at least one flexible membrane attached to the support cooperating with the support to form at least one containment filled with at least one first liquid, for example a conducting liquid such as water, in the form of one or several drops and at least one second fluid, for example a gas such as air or nitrogen, and electrical means comprising one or several electrodes to modulate the profile of the membrane by controlling the shape of at least one of said drops.

The invention claimed is:
1. An actuation device comprising:
   a support;
   a flexible membrane attached to the support, cooperating with the support to form a volume filled with a first liquid and a second liquid, the first liquid and the second liquid being immiscible such that one or plural drops of said first liquid are embedded in said second liquid;

an electrode coupled to said support; and a polarization device configured to control a polarization of the electrode thereby controlling the shape of at least one of the drops of said first liquid so as to controllably deform the membrane.

2. A device according to claim 1, the profile of the membrane being modulated with a constant volume of the first liquid and the second liquid in the containment.

3. A device according to claim 1, the profile of the membrane being modulated with a variable volume of the second liquid in the containment.

4. A device according to claim 1, in which the membrane is parallel to a principal plane of the support.

5. A device according to claim 1, configured to adopt at least one position in which the membrane comprises a curved profile.

6. A device according to claim 1, configured to adopt at least one position in which at least one drop is in contact both with the support and the membrane and holds a zone of the membrane at a first distance from the support, the device further configured to adopt at least one other position in which the drop is in contact both with the support and the membrane, and holds the zone of the membrane at a second distance from the support different from the first distance.

7. A device according to one claim 1, configured to adopt a position different from the rest position in which the profile of the membrane is different from the given profile in which at least one first drop is in contact both with the support and the membrane and holds a first zone of the membrane at a first distance from the support, at least one other drop is in contact both with the support and the membrane and holds a second zone of the membrane at a second distance from the support, different from the first distance.

8. A device according to claim 1, configured to adopt at least one position different from the rest position in which the membrane includes a sinuous profile.

9. A device according to claim 1, in which in the rest position a drop is located facing a zone of the membrane at a rest distance from the support being in contact with the membrane, the device configured to adopt at least one other position in which the drop is in contact both with the support and the membrane, and holds the membrane zone at a distance from the support different from the rest distance.

10. A device according to claim 1, in which, in the rest position, at least one drop of the first liquid is in contact with the support and with the membrane.

11. A device according to claim 1, in which, in the rest position, the drops of the first liquid are in contact with the support and are not in contact with the membrane.

12. A device according to claim 1, one or plural of the electrodes being integrated into the support, and facing at least one drop.

13. A device according to claim 1, the electrodes being arranged as a matrix.

14. A device according to claim 1, one or plural of the electrodes being integrated into the membrane.

15. A device according to claim 1, the membrane including one or plural electrodes facing electrodes integrated into the support.

16. A device according to claim 1, the polarization device is configured to put the electrodes in a polarization state in which at least one first electrode is at a first potential, and at least one other electrode is at a second potential different from the first potential.

17. A device according to claim 1, in which the electrode is covered by at least one dielectric layer.

18. A device according to claim 1, further comprising at least one cover facing the support and configured to hold the containment in a closed space.

19. An adaptative optical device comprising:
an actuation device according to claim 1, the membrane being based on at least one material transparent to light rays.

20. A device according to claim 1, the electrode and/or the support being based on at least one transparent material.

21. A device according to claim 20, refraction index of the first liquid and refraction index of the second liquid being equal or approximately equal.

22. An adaptative optical device comprising:
an actuation device according to claim 1, the membrane comprising at least one reflecting layer of light rays or being coupled with a reflecting layer for light rays.

23. An electrical switch device comprising:
an actuation device according to claim 1;
at least one electricity conducting element attached to the membrane of the actuation device; and
at least one first conducting zone and at least one second conducting zone separate from the first conducting zone, the membrane configured to adopt at least one first position in which the electricity conducting element is in contact with the first conducting zone and the second conducting zone, and at least one second position in which the first conducting zone and/or the second conducting zone is not in contact, or are not in contact, with the conducting element.

24. An optical switch device comprising:
an actuation device according to claim 1 and
at least one element attached to the membrane of the actuation device and configured to intercept an optical beam, the membrane configured to adopt at least one first position in which the element intercepts an optical beam, and at least one second position in which the element and the beam do not intersect.

25. A valve device comprising:
an actuation device according to claim 1; and
at least one zone, forming a channel with the membrane in which at least one fluid will circulate, the membrane configured to adopt at least one first position in which the membrane or an element attached to the membrane is in contact with the zone, and at least one second position in which the membrane or the element attached to the membrane is not in contact with the zone.

26. A pumping device comprising:
an actuation device according to one of claim 1;
at least one element forming a piston attached to the membrane; and
at least one work chamber in which the element forming a piston is capable of moving.

27. A device according to claim 1, wherein the support has a contact surface in contact with said first and second liquids, and said first and second liquids are different from each other such that the contact surface has a wettability relative to said second liquid that is lower than a wettability of said contact surface relative to said first liquid.

28. A device according to claim 27, wherein said first liquid comprises water and said second liquid comprises oil.

29. A device according to claim 28, wherein said contact surface is hydrophobic.

30. A device according to claim 1, wherein the profile of the membrane is modulated by electrowetting.

* * * * *